No. 823,942. PATENTED JUNE 19, 1906.
E. O. FLICHINGER.
BRAKE MECHANISM.
APPLICATION FILED NOV. 11, 1905.

Witnesses
Edwin G. McKee
C. C. Hines

Inventor
E. O. Flichinger
By Victor J. Evans
Attorney

UNITED STATES PATENT OFFICE.

EDWARD O. FLICHINGER, OF MASSILLON, OHIO.

BRAKE MECHANISM.

No. 823,942.  Specification of Letters Patent.  Patented June 19, 1906.

Application filed November 11, 1905. Serial No. 286,868.

*To all whom it may concern:*

Be it known that I, EDWARD O. FLICHINGER, a citizen of the United States of America, residing at Massillon, in the county of Stark and State of Ohio, have invented new and useful Improvements in Brake Mechanism, of which the following is a specification.

This invention relates to improvements in brake mechanisms for railway-cars, the primary object of the invention being to provide a construction of brake mechanism which obviates the use of brake-beams and other cumbersome appliances and disposes the brake-operating levers upon the trucks of the cars, the levers being combined and arranged in such manner as to yield a high degree of braking pressure.

Figure 1:
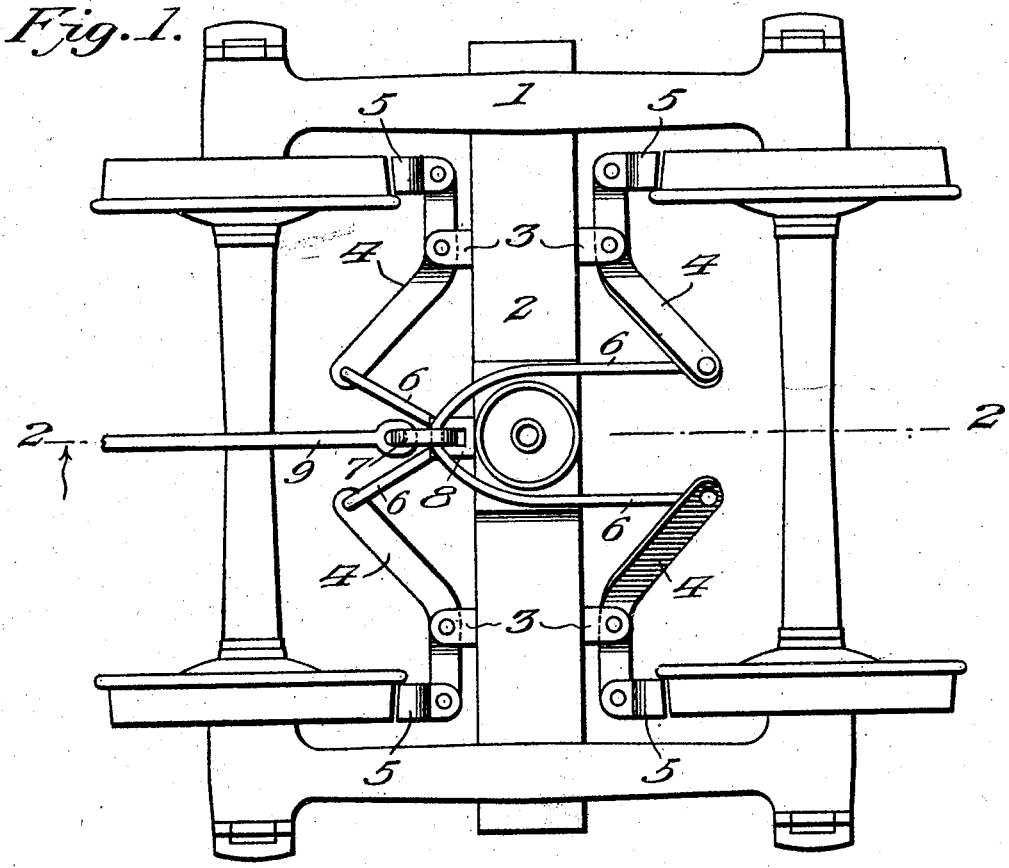
Figure 2:
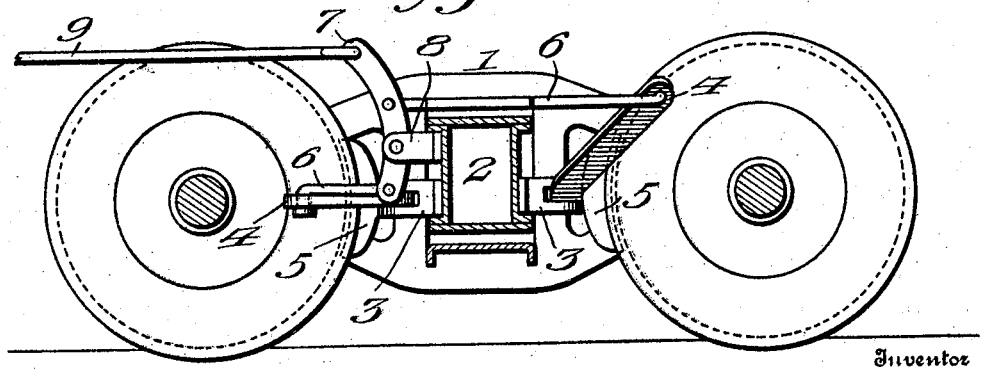

In the accompanying drawings, illustrating the invention, Figure 1 is a top plan view of a truck equipped with my improved brake mechanism. Fig. 2 is a vertical longitudinal section through the truck and brake mechanism on the line 2 2 of Fig. 1.

In accordance with my invention the brake devices for operating the brake-shoes engaging the wheels of each truck are mounted upon the stationary truck-bolster, the numeral 1 in the drawings designating the truck-frame, and 2 the stationary bolster. Secured to each side of the bolster on opposite sides of the transverse center thereof are fulcrum blocks or brackets 3, to each of which is pivotally connected a brake-lever 4. Each brake-lever 4 is of bell-crank form, and the outer arm thereof is arranged horizontally or extended at a slight downward angle from the fulcrum-block and has pivotally connected thereto the brake-shoe 5, while the inner arm of the lever extends at an angle upwardly and outwardly from the beam. The inner arms of each set of levers are disposed in convergent relation and are pivotally connected by links 6 to an operating-lever 7. The lever 7 is disposed upon one side of the beam and fulcrumed between its ends to a block or bracket 8, the links of the adjacent set of brake-levers being connected with said operating-lever below the pivotal point thereof, while the links of the other set of brake-levers are connected with the operating-lever above its pivotal point and extend across the upper surface of the bolster 2 and in practice between the same and the superposed bolster member connected with the body of the car. The arrangement of the set of links 6, which crosses the beam, is such as to prevent interference with the center pin upon which the truck is pivotally mounted, said levers being preferably disposed so as to extend on opposite sides of said pin, as shown in Fig. 1. The upper end of the lever 7 is connected in the customary manner with a brake-rod 9, which may be controlled through the usual brake-actuating connection. It will be apparent that when the lever 7 swings in one direction both sets of brake-levers will be operated through the links to apply the brake-shoe to the wheel, but when said lever swings in the opposite direction both sets of brake-levers will be retracted.

By the construction and arrangement of parts described it will be seen that high power may be obtained for applying brake-shoes with the requisite degree of force and that the use of brake-beams and other cumbersome parts is obviated.

Having thus described the invention, what is claimed as new is—

1. In a brake mechanism, the combination with a truck having a bolster, of a pair of brake-levers disposed upon each side of the bolster, each set of levers carrying brake-shoes at one end and having convergently-arranged opposite ends extending outwardly from the bolster, an operating-lever fulcrumed upon one side of the bolster, and links connecting the convergently-arranged ends of the opposite sets of levers to the operating-lever above and below the pivotal connection of the latter.

2. In a brake mechanism, the combination of a car-truck having a bolster, fulcrum-blocks on opposite sides of the bolster, bell-crank brake-levers fulcrumed to said blocks, each set of levers carrying brake-shoes at their outer ends and having their inner ends convergently arranged and extending outwardly from the bolster, one set of levers having its converging ends extending upwardly at an angle above the plane of the bolster, an operating-lever fulcrumed upon one side of the bolster, and links pivotally connecting the convergent ends of the brake-levers to
5 the operating-lever above and below the pivotal connection of the latter, one set of links extending across the bolster:

In testimony whereof I affix my signature in presence of two witnesses.

EDWARD O. FLICHINGER.

Witnesses:
 WILLIAM J. RIES,
 ISAAC COWARD.